(12) United States Patent
Long et al.

(10) Patent No.: US 10,530,152 B2
(45) Date of Patent: Jan. 7, 2020

(54) POWER DISTRIBUTION SYSTEMS

(71) Applicant: GE Energy Power Conversion Technology Limited, Rugby, Warwickshire (GB)

(72) Inventors: Teng Long, Rugby (GB); Ushindibaba Mupambireyi, Rugby (GB)

(73) Assignee: GE Energy Power Conversion Technology Limited (GB)

(*) Notice: Subject to any disclaimer, the term of this patent is extended or adjusted under 35 U.S.C. 154(b) by 55 days.

(21) Appl. No.: 15/741,771

(22) PCT Filed: Jul. 8, 2016

(86) PCT No.: PCT/GB2016/052056
§ 371 (c)(1),
(2) Date: Jan. 4, 2018

(87) PCT Pub. No.: WO2017/009608
PCT Pub. Date: Jan. 19, 2017

(65) Prior Publication Data
US 2018/0191156 A1    Jul. 5, 2018

(30) Foreign Application Priority Data
Jul. 16, 2015 (EP) .................................... 15176969

(51) Int. Cl.
*H02H 9/08* (2006.01)
*H02M 1/32* (2007.01)
(Continued)

(52) U.S. Cl.
CPC ............. *H02H 9/08* (2013.01); *B60L 3/0084* (2013.01); *H02H 7/1227* (2013.01);
(Continued)

(58) Field of Classification Search
CPC ...... H02H 9/08; H02H 7/1227; H02H 7/1257; B60L 3/0084; B60L 2200/32; H02J 3/00;
(Continued)

(56) References Cited

U.S. PATENT DOCUMENTS 4,904,919 A    2/1990  McNaughton
6,009,003 A   12/1999  Yeo
(Continued)

FOREIGN PATENT DOCUMENTS

| EP | 2 320 549 A1 | 5/2011 |
| WO | 2012/049441 A1 | 4/2012 |
| WO | 2014/077586 A1 | 5/2014 |

OTHER PUBLICATIONS

Extended European Search Report and Written Opinion issued in connection with corresponding EP Application No. 15176969.2 dated Jan. 29, 2016.
(Continued)

*Primary Examiner* — Carlos Amaya
(74) *Attorney, Agent, or Firm* — Wood IP LLC

(57) ABSTRACT

A power distribution system has a power converter with a plurality of semiconductor switching devices per phase, a PWM controller, and a current limitation controller. The current limitation controller is adapted, at least when a short-circuit fault is detected, to calculate the difference between a measured current for each phase and a reference current for the corresponding phase. If the calculated difference is located outside a predetermined current range centered about the reference current for the corresponding phase, the current limitation controller will allow the semiconductor switching devices of the corresponding phase to be turned on and off by the PWM controller. Otherwise, if the calculated difference is located inside the predetermined current range, the current limitation controller will control the semiconductor switching devices for the corresponding
(Continued)

phase to be turned off irrespective of the PWM control strategy applied by the PWM controller.

15 Claims, 6 Drawing Sheets

(51) Int. Cl.
*H02J 3/00* (2006.01)
*H02M 5/458* (2006.01)
*B60L 3/00* (2019.01)
*H02H 7/122* (2006.01)
*H02H 7/125* (2006.01)
*H02M 7/5387* (2007.01)
*H02P 27/08* (2006.01)

(52) U.S. Cl.
CPC ............ *H02H 7/1257* (2013.01); *H02J 3/00* (2013.01); *H02J 3/006* (2013.01); *H02M 1/32* (2013.01); *H02M 5/458* (2013.01); *B60L 2200/32* (2013.01); *H02M 7/53871* (2013.01); *H02P 27/08* (2013.01); *Y04S 10/525* (2013.01); *Y10S 903/93* (2013.01)

(58) Field of Classification Search
CPC .......... H02J 3/006; H02M 1/32; H02M 5/458; H02M 7/53871; H02P 27/08; Y04S 10/525; Y10S 903/93
USPC ......................................................... 307/9.1
See application file for complete search history.

(56) References Cited

U.S. PATENT DOCUMENTS

| | | |
|---|---|---|
| 2012/0309242 A1 | 12/2012 | Haugland |
| 2013/0286514 A1 | 10/2013 | Oguchi et al. |
| 2013/0322133 A1* | 12/2013 | Li .................... G01R 31/025 363/37 |

OTHER PUBLICATIONS

International Search Report and Written Opinion issued in connection with corresponding PCT Application No. PCT/GB2016/052056 dated Nov. 9, 2016.

\* cited by examiner

POWER DISTRIBUTION SYSTEMS

TECHNICAL FIELD

The present invention relates to power distributions systems, and in particular to marine power distribution systems or marine power distribution and propulsion systems. The term 'marine vessels' is intended to include ships, drilling rigs and any other surface-going vessels or platforms or submersible (submarine) vessels.

BACKGROUND OF THE INVENTION

Marine power distribution and propulsion systems are well known. In a typical arrangement a series of power converters are used to interface a main ac bus to a series of loads which can be electric motors, e.g., propulsion motors or thrusters. Other loads can be connected directly to the main ac bus or connected to an auxiliary ac bus which is in turn connected to the main ac bus by means of a transformer. The ac buss typically operate at different voltages, e.g., 690 VAC and 440 VAC.

Each power converter can have an 'active front end' (AFE) converter with a supply-side active rectifier/inverter (or 'front end' bridge) having ac terminals connected to the main ac bus and a load-side active rectifier/inverter connected to the load. The dc output of the supply-side active rectifier/inverter is connected to the dc input of the load-side active rectifier/inverter by a dc link. In normal operation, the supply-side active rectifier/inverter will operate as an active rectifier to supply power to the dc link and the load-side active rectifier/inverter will operate as an inverter to supply power to the load.

Each active rectifier/inverter will typically have a conventional topology.

A prime mover (e.g., a diesel engine or turbine) is connected to individual generators which supply power to the main ac bus.

The main ac bus can be equipped with protective switchgear with circuit breakers and associated controls.

The marine propulsion system will typically include a first (or port) ac bus and a second (or starboard) ac bus that are interconnected by a bus tie. Some marine propulsion systems use a plurality of ac bus sections or groups interconnected by a plurality of bus ties to improve power availability.

In one arrangement, shown in FIG. 1, the marine propulsion system 1 includes a power take-in/power take-out (PTI/PTO) hybrid drive system 2. The hybrid drive system 2 includes an electrical machine 4 and a diesel engine 6. The electrical machine 4 can be a synchronous machine or an asynchronous machine such as an induction machine. The rotor of the electrical machine 4 and the driving end of the diesel engine 6 are mechanically coupled for example through a clutch and gearbox 8 and are used to drive a propulsion thruster 10, for example. The electrical machine 4 is connected to the main ac bus 12 by means of an AFE converter 14 with a supply-side active rectifier/inverter 16 having ac terminals connected to the main ac bus and a machine-side active rectifier/inverter 18 connected to the electrical machine. The dc output of the supply-side active rectifier/inverter 16 is connected to the dc input of the machine-side active rectifier/inverter 18 by a dc link 20. During a PTI mode, the electrical machine 4 is operated as a motor and is used to drive the propulsion thruster 10. Power is supplied to the electrical machine 4 from the main ac bus 12 through the AFE converter 14 with the supply-side active rectifier/inverter 16 being operated as an active rectifier and the machine-side active rectifier/inverter 18 being operated as an inverter. During a PTO mode, the electrical machine 4 is operated as a generator with the rotor of the electrical machine being driven by the diesel engine 6. Power is supplied from the electrical machine 4 to the main ac bus 12 through the AFE converter 14 with the machine-side active rectifier/inverter 18 being operated as an active rectifier and the supply-side active rectifier/inverter 16 being operated as an inverter.

Diesel generators 22, 24 supply power to the main ac bus 12. In some situations, the hybrid drive system 2 can be used as the only power source for the marine propulsion system 1 during a normal operating mode. For example, the diesel generators 22, 24 can be turned off to reduce fuel costs or to try and minimise harmful emissions emitted the diesel engines. In other situations, the hybrid drive system 2 can be the sole power source for the marine propulsion system 1 because the diesel generators 22, 24 are non-operational for any reason, e.g., as a result of an electric power blackout. In this case, the hybrid drive system 2 might need to recover the main ac bus 12 by supplying power to the main ac bus through the AFE converter 14. In other words, the electrical machine 4 will be driven by the diesel engine 6 and operated as a generator for recovery purposes.

In a situation where the hybrid drive system 2 is the sole power source for the marine propulsion system 1, and a short-circuit fault occurs at a certain load branch of the marine propulsion system 1, the hybrid drive system 2 must operate without tripping to avoid an entire power blackout. To ensure that the circuit breaker associated with the load branch that is experiencing the short-circuit fault is able to properly discriminate and disconnect the faulty load branch from the remainder of the marine propulsion system 1, the AFE converter 14 needs to provide a certain amount of overcurrent for a certain period of time to enable selective fault discrimination. The AFE converter 14 must also be capable of operating without tripping or failing due to thermal overload. In particular, one or both of the supply-side active rectifier/inverter 16 and the machine-side active rectifier/inverter 18 may need to provide overcurrent and perhaps at a level that is determined by the X/R ratio during the short-circuit fault.

One way of limiting fault current in such situations is to use reactors or transformers. However, this is a passive strategy and is highly dependent upon the impedance of the reactors or transformers. The passive impedance is able to limit the amplitude of the fault current, but cannot eliminate the imbalance caused by individual phase fault currents and any dc offset between individual phase and multi-phase fault currents. Imbalanced fault currents can lead to system instabilities, additional negative sequence voltages and currents, increased thermal stress on the system components etc. The dc offset can cause wound magnetic components (e.g., in the transformers) to saturate and consequently lead to cascaded system failures. A passive strategy has other drawbacks such as high cost, large physical size and mass, additional voltage drops and high standby losses.

An embodiment of the present invention proposes an alternative method of current limitation which avoids fault current imbalances and dc offsets and does not need additional passive hardware components in the system.

BRIEF DESCRIPTION OF THE INVENTION

An embodiment of the present invention provides a power distribution system (e.g., a marine power distribution system or a marine power distribution and propulsion system) having one or more phases, the power distribution system comprising a power converter with a plurality of semiconductor switching devices per phase, a pulse width modulation (PWM) controller, and a current limitation controller adapted, at least when a short-circuit fault is detected, to:

calculate the difference between a measured current for each phase and a reference current for the corresponding phase; and if the calculated difference is located outside a predetermined current range (e.g., the proportional band of an on-off controller forming part of the current limitation controller) centered about the reference current for the corresponding phase, allow the semiconductor switching devices of the corresponding phase to be turned on and off by the PWM controller, e.g., on the basis of a PWM control strategy;

if the calculated difference is located inside the predetermined current range, control the semiconductor switching devices for the corresponding phase to be turned off or inhibited.

When the calculated difference is located inside the predetermined current range, the PWM control strategy for the corresponding phase is effectively overridden by the current limitation controller and the semiconductor switching devices are turned off or inhibited to provide current limitation.

In one arrangement, the PWM controller can generate a first signal per phase having a first value (e.g., a high value) indicating that the semiconductor switching devices for the corresponding phase should be turned on and a second value (e.g., a low value) indicating that the semiconductor switching device for the corresponding phase should be turned off or inhibited. As used herein, a high value might be "1" and a low value might be "0", for example.

The current limitation controller can be further adapted to generate a second signal per phase having a first value (e.g., a high value) indicating that the semiconductor switching devices for the corresponding phase can be turned on if the calculated difference is located outside the predetermined current range or a second value (e.g., a low value) indicating that the semiconductor switching devices for the corresponding phase should be turned off or inhibited if the calculated difference is located inside a predetermined current range. The current limitation controller can be further adapted to use the first and second signals to generate a third signal per phase having a first value (e.g., a high value) indicating that the semiconductor switching devices for the corresponding phase should be turned on and a second value (e.g., a low value) indicating that the semiconductor switching devices for the corresponding phase should be turned off or inhibited.

The current limitation controller can generate each third signal by applying a logical conjunction to the corresponding first and second signals. Each third signal can have the first value if both the corresponding first and second signals have the first value and otherwise the third signal can have the second value. Put another way, each third signal can have the second value if: the corresponding second signal has the first value and the corresponding first signal has the second value; or if the corresponding second signal has the second value and the corresponding first signal has the first or second value.

When a second signal has the first value, the corresponding third signal is effectively controlled by the corresponding first signal, i.e., the phase output of the current limitation controller is determined by the corresponding phase output of the PWM controller. This is because the calculated difference between the measured current and the reference current for the corresponding phase is located outside the predetermined current range so the semiconductor switching devices for the corresponding phase can be turned on and off according to a PWM control strategy in the same way as they would when the power distribution system is operating normally. Put another way, when a second signal has the first value, the current limitation controller allows the semiconductor switching devices for the corresponding phase to be turned on and off by the PWM controller on the basis of the corresponding first signal.

When a second signal has the second value, the corresponding third signal will always have the second value because the calculated difference between the measured current and the reference current for the corresponding phase is located inside the predetermined current range. The semiconductor switching devices for the corresponding phase are turned off or inhibited even if the first signal has the first value and the normal PWM control strategy is overridden by the current limitation controller.

The logical conjunction can be summarised by the following table:

| Input A (First signal) | Input B (Second signal) | Output (Third signal) |
|---|---|---|
| High | High | High |
| Low | High | Low |
| High | Low | Low |
| Low | Low | Low |

The individual semiconductor switching devices of the power converter can be turned on and off by gate control in a conventional manner, e.g., by gate drivers operated under the control of an appropriate command signal. In one arrangement, each first signal generated by the PWM controller can be used to control the semiconductor switching devices for the corresponding phase to be turned on and off during normal operation of the power distribution system and each third signal generated by the current limitation controller can be used to control the semiconductor switching devices for the corresponding phase to be turned on and off when a short-circuit fault is detected. Each first signal and each third signal can be provided in parallel to a control selector which selects between the first and third signals depending on the operating condition of the power distribution system and which provides the selected signal to the gate drivers as a fourth signal (or command signal) per phase having a first value (e.g., a high value) indicating that the semiconductor switching devices for the corresponding phase should be turned on and a second value (e.g., a low value) indicating that the semiconductor switching devices for the corresponding phase should be turned off or inhibited. The current limitation controller can be operated continuously or operated only when a short-circuit fault has been detected, e.g., by a fault detection system that can form part of the power distribution system and detects a fault if a measured current exceeds a predetermined threshold. Other ways of detecting a short-circuit fault can also be used.

In another arrangement, the control selector can be omitted and each third signal generated by the current limitation controller can be provided to the gate drivers as a command signal and used to control the semiconductor switching devices for the corresponding phase to be turned on and off during normal operation of the power distribution system and when a short-circuit fault is detected. In this arrangement, the first signal generated by the PWM controller is provided only to the current limitation controller.

The power distribution system can further include an electrical machine. The electrical machine can be electrically connected to an ac bus of the power distribution system by the power converter. The electrical machine can be of any suitable type or construction. In one arrangement, the electrical machine can be a synchronous machine or an induction (or asynchronous) machine.

The electrical machine can form part of a hybrid drive system further comprising a prime mover, the rotor of the electrical machine and the driving end of the prime mover being mechanically coupled to a load, e.g., by means of a mechanical linkage such as a gearbox. The hybrid drive system can use any suitable prime mover, e.g., a diesel engine or turbine. The power distribution system as described herein can be a marine power distribution system or a marine power distribution and propulsion system, for example. In this case, the hybrid drive system can be used to drive a propeller or propulsion thruster.

In one arrangement, the power converter can be an active rectifier/inverter (or supply bridge) having ac input terminals electrically connected to an ac bus, and dc output terminals. Such a power converter can typically be operated as an active rectifier when power is supplied from the ac bus to the electrical machine, e.g., when the electrical machine of a hybrid drive system is operating as a motor during a PTI mode, and as an inverter when power is supplied from the electrical machine to the ac bus, e.g., when the electrical machine of a hybrid drive system is operating as a generator during a PTO mode. The power distribution system can further include a second power converter which can be an active rectifier/inverter (or machine bridge) having dc input terminals electrically connected to the dc output of the first power converter by a dc link, and ac output terminals electrically connected to the electrical machine. Such a second power converter can be operated as an inverter when power is supplied from the ac bus to the electrical machine, e.g., when the electrical machine of a hybrid drive system is operating as a motor during a PTI mode, and as an active rectifier when power is supplied from the electrical machine to the ac bus, e.g., when the electrical machine of a hybrid drive system is operating as a generator during a PTO mode. In another arrangement, the power converter can be an active rectifier/inverter (or machine bridge) having ac output terminals electrically connected to the electrical machine and dc input terminals and where the power distribution system can further include a second power converter which can be an active rectifier/inverter (or supply bridge) having ac input terminals electrically connected to an ac bus, and dc output terminals electrically connected to the dc input of the first power converter by a dc link.

The first and second power converters can together define an active front end (AFE) converter. Only one of the first and second power converters will normally be rated for the full prospective fault current which leads to significant cost savings.

Each power converter (or bridge) employed in the power distribution system can have any suitable topology such as a two-level, three-level or multi-level topology with a series of semiconductor switching devices fully controlled and regulated using a pulse width modulation (PWM) strategy during normal operation, for example. Any suitable semiconductor switching devices can be used, e.g., insulated-gate bipolar transistors (IGBTs).

In one arrangement, ac generators can be electrically connected to the ac bus. The ac generators can provide power to the ac bus during normal operation of the power distribution system and each has an associated prime mover, e.g., a diesel engine or turbine. But it will be readily appreciated that in other arrangements the electrical machine that is connected to the ac bus by the power converter can be the sole provider of power to the ac bus during both normal and fault conditions.

The electrical machine can be used as a generator to supply power to the ac bus through the power converter. For example, in the case of a hybrid drive system, the electrical machine will be driven by the prime mover and operated as a generator for recovery purposes or as a normal power source.

During a short-circuit fault situation, the current limitation controller can control the power converter to provide controlled overcurrent for a certain period of time to allow the circuit breaker to properly discriminate and disconnect the faulty load branch. This can be critical if the electrical machine is the sole power source for the power distribution system, e.g., if there are no ac generators or the ac generators are non-operational for any reason. In some examples, the controlled overcurrent might be about 2× the nominal or rated current.

The current limitation controller can include an on-off controller (sometimes referred to as a hysteresis controller) for each phase with a proportional band that is centered about the reference current for the corresponding phase and which defines the predetermined current range. Such on-off controllers are fast acting, robust and are easy to implement. Each on-off controller receives the calculated difference of the measured current and the reference current for the corresponding phase as an input (e.g., as the output from a summing node), and can provide the second signal as an output. The size of the predetermined current range (or the proportional band of each on-off controller) determines the ripple current. A narrower current range results in a smaller ripple current and faster switching and vice versa. The predetermined reference current and/or the current range for each phase can be determined with reference to thermal analysis of the power converter. For example, the parameters of each on-off controller can be selected to meet the thermal requirements of the semiconductor switching devices of the power converter. Other factors that might affect the parameters of each on-off controller, and which are inputs for the current limitation controller design process, include circuit breaker discrimination requirements, and acceptable limits for voltage drop and distortion during short-circuit FRT.

The current limitation controller can be implemented as software or firmware, for example. In one arrangement, the current limitation controller can be implemented as a field-programmable gate array (FPGA) or similar integrated circuit.

An embodiment of the present invention further provides a short-circuit FRT method for a power distribution system (e.g., a marine power distribution system or a marine power distribution and propulsion system) having one or more phases, the power distribution system comprising a power converter with a plurality of semiconductor switching devices per phase, the method comprising the steps of: calculating the difference between a measured current for each phase and a reference current for the corresponding phase; and if the calculated difference is located outside a predetermined current range (e.g., the proportional band of an-off controller forming part of a current limitation controller) centered about the reference current for the corresponding phase, allowing the semiconductor switching devices of the corresponding phase to be turned on and off, e.g., by a PWM controller on the basis of a PWM control strategy; if the calculated difference is located inside the predetermined current range, controlling the semiconductor switching devices for the corresponding phase to be turned off or inhibited.

If the calculated difference is located inside the predetermined current range, the semiconductor switching devices for the corresponding phase are controlled to be turned off or inhibited regardless of any PWM control strategy applied by the PWM controller.

In one arrangement, the method can further comprise the step of generating a first signal per phase having a first value (e.g., a high value generated by the PWM controller) indicating that the semiconductor switching devices for the corresponding phase should be turned on and a second value (e.g., a low value) indicating that the semiconductor switching device for the corresponding phase should be turned off or inhibited.

The method can further comprise the steps of: generating a second signal per phase having a first value (e.g., a high value) indicating that the semiconductor switching devices for the corresponding phase can be turned on if the calculated difference is located outside a predetermined current range (e.g., the proportional band of an on-off controller forming part of the current limitation controller) centered about the reference current for the corresponding phase or a second value (e.g., a low value) indicating that the semiconductor switching devices for the corresponding phase should be turned off or inhibited if the calculated difference is located inside a predetermined current range; and using the first and second signals to generate a third signal per phase having a first value (e.g., a high value) indicating that the semiconductor switching devices for the corresponding phase should be turned on and a second value (e.g., a low value) indicating that the semiconductor switching devices for the corresponding phase should be turned off or inhibited.

The method eliminates the dc offset between the individual phase fault currents that are present in passive, impedance-based, strategies. The amplitude of the fault current is fully controlled and can be adjusted depending on the thermal margin of the semiconductor switching devices in the power converter, and other factors mentioned above such as the discrimination requirements for the circuit breakers, acceptable voltage drop and distortion etc.

It will be readily appreciated that maintaining balanced fault currents provides improved system stability.

BRIEF DESCRIPTION OF THE DRAWINGS

With reference to FIG. 2, a marine power distribution and propulsion system 30 includes a PTI/PTO hybrid drive system 32. The hybrid drive system 32 includes an electrical machine 34 and a diesel engine 36. The rotor of the electrical machine 34 and the driving end of the diesel engine 36 are mechanically coupled through a clutch and a gearbox 38 and are used to drive a propulsion thruster 40, for example.

Figure 1:
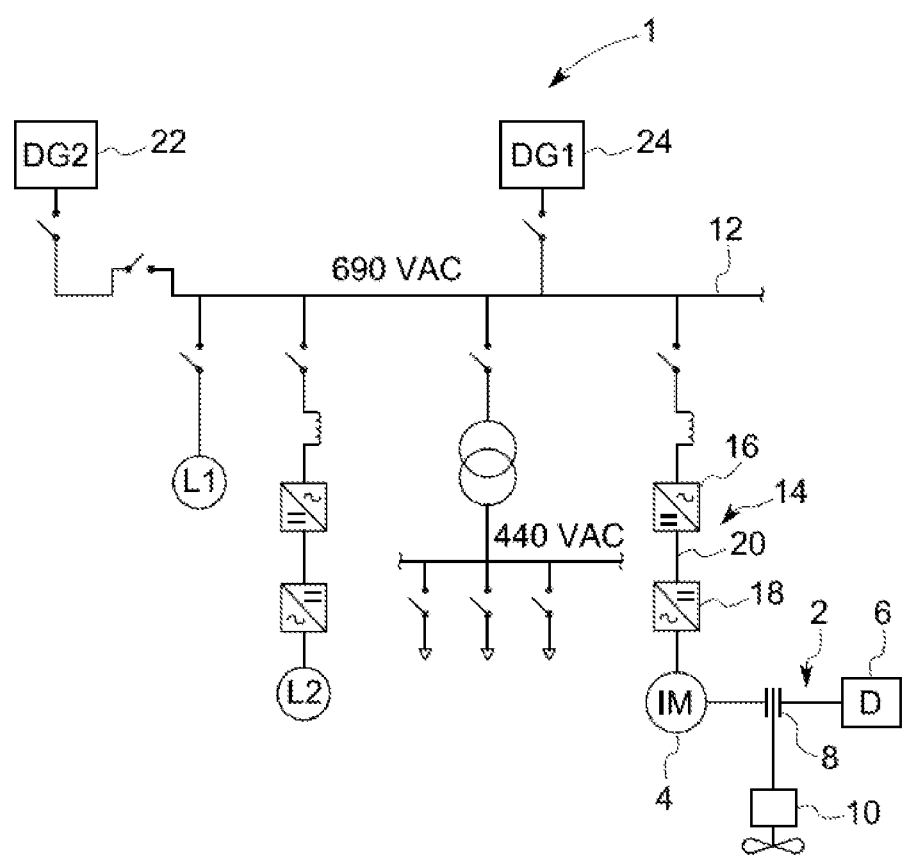
FIG. 1 is a schematic drawing showing a known marine power distribution and propulsion system with a hybrid drive system.

The electrical machine 34 is connected to a main ac bus 42 by means of an AFE converter 44 with a supply bridge 46 having ac terminals connected to the main ac bus by means of a line reactor and a machine bridge 48 connected to the terminals of the electrical machine. The dc output of the supply bridge 46 is connected to the dc input of the machine bridge 48 by a dc link 50 with one or more capacitors.

Diesel generators (not shown) supply power to the main ac bus 42.

A PWM controller 52 for the supply bridge 46 includes a vector controller 54 that receives measured phase currents for each phase "a", "b" and "c" from current sensors (not shown) and a measured phase angle θ. The measured phase currents are labelled Ia, Ib and Ic. The vector controller 54 uses the measured phase currents Ia, Ib and Ic and the measured phase angle θ to determine reference phase signals Va_ref, Vb_ref and Vc_ref which are provided to a PWM generator 56. It will be readily understood that in practice the AFE converter 44 can have any suitable number of phases and that the PWM controller 52 and the current limitation controller 58 described below can be adapted accordingly.

Figure 2:
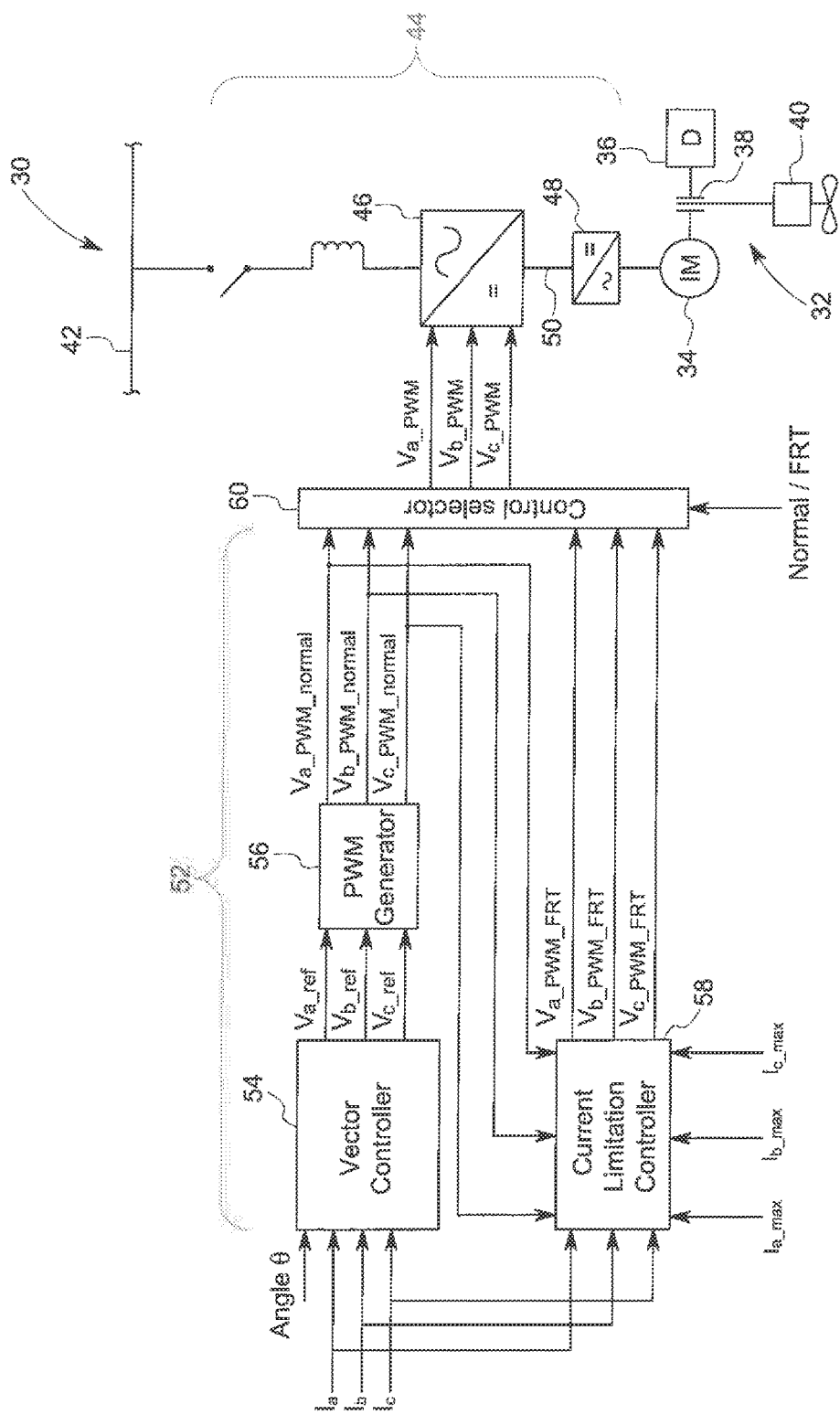
FIG. 2 is a schematic drawing showing part of a marine power distribution and propulsion system with a first current limitation controller.

The PWM generator 56 uses the reference phase signals Va_ref, Vb_ref and Vc_ref to generate first signals for each phase "a", "b" and "c". The first signals are labelled Va_PWM_normal, Vb_PWM_normal and Vc_PWM_normal and each has a high value (e.g., "1") indicating that the semiconductor switching devices of the corresponding phase of the supply bridge 46 should be turned on or a low value (e.g., "0") indicating that the semiconductor switching devices of the corresponding phase should be turned off or inhibited. The first signals Va_PWM_normal, Vb_PWM_normal and Vc_PWM_normal generated by the PWM generator 56 for phases "a", "b" and "c" are provided to a current limitation controller 58 and to a control selector 60 as shown in FIG. 2.

The current limitation controller 58 also receives the measured phase currents Ia, Ib and Ic and reference phase currents Ia_max, Ib_max and Ic_max. The reference phase currents Ia_max, Ib_max and Ic_max are predetermined fixed values and set the limited overcurrent for short-circuit fault ride-through (FRT) control. Suitable semiconductor switching devices of the supply bridge (e.g., IGBTs) can typically be operated at about 2× rated current for about 10 seconds. The fixed values for the reference phase currents Ia_max, Ib_max and Ic_max might therefore be set at about 2× rated current of the respective semiconductor switching devices, for example.

Figure 4:
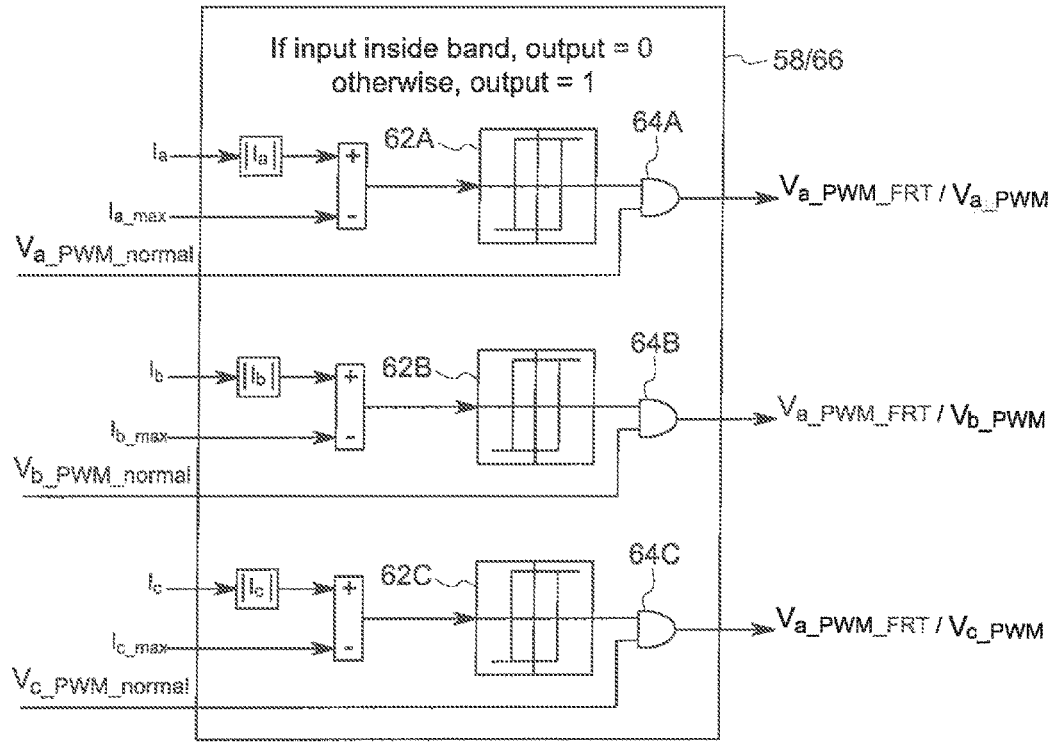
FIG. 4 is a schematic drawing showing the current limitation controller of FIGS. 2 and 3.

The current limitation controller 58 is shown in more detail in FIG. 4 and includes an on-off controller 62A, 62B and 62C for each phase. The magnitude of each measured phase current Ia, Ib and Ic is determined and is summed with the corresponding reference phase current Ia_max, Ib_max and Ic_max using a summing node. The calculated difference between each measured phase current and the corresponding reference phase current is provided to each on-off controller 62A, 62B and 62C as an input. In particular, the measured phase current Ia for phase "a" is summed with the reference phase current Ia_max for phase "a" and the calculated difference is provided to the first on-off controller 62A, the measured phase current Ib for phase "b" is summed with the reference phase current Ib_max for phase "b" and the calculated difference is provided to the second on-off controller 62B, and the measured phase current Ic for phase "c" is summed with the reference phase current Ic_max for phase "c" and the calculated difference is provided to the third on-off controller 62C.

Each on-off controller 62A, 62B and 62C has a proportional band centered on the corresponding reference phase current Ia_max, Ib_max and Ic_max. For example, the proportional band can be about ±5% the corresponding reference phase current. This would require about 2× the normal switching frequency (e.g., 5 kHz) during fault limitation control and give about 15% total harmonic distortion (THD). If the input is inside the proportional band, the output of the on-off controller 62A, 62B and 62C is "0" otherwise the output of the on-off controller is "1". The output of each on-off controller 62A, 62B and 62C is a second signal. Each second signal therefore has a high value (i.e., "1") indicating that the semiconductor switching devices of the corresponding phase of the supply bridge 46 can be turned on and off because the input is outside the proportional band and current limitation does not need to be applied or a low value (i.e., "0") indicating that the semiconductor switching devices of the corresponding phase should be turned off or inhibited because the input is inside the proportional band and current limitation needs to be applied.

The current limitation controller 58 also includes a logic controller 64A, 64B and 64C for each phase. The first and second signals for each phase are provided to the logic controllers 64A, 64B and 64C as inputs. In particular, the first signal Va_PWM_normal generated by the PWM generator 56 for phase "a" and the output of the first on-off controller 62A are provided to the first logic controller 64A as inputs, the second signal Vb_PWM_normal generated by the PWM generator for phase "b" and the output of the second on-off controller 62B are provided to the second logic controller 64B as inputs, and the first signal Vc_PWM_normal generated by the PWM generator for phase "c" and the output of the third on-off controller 62C are provided to the logic controller 64C as inputs. The logic controllers 64A, 64B and 64C provide logical conjunction (e.g., carry out an AND function) on the first and second signals and output a third signal based on the following table:

| Input A (phase n)<br>(Vn_PWM_normal) | Input B<br>(Second signal) | Output (phase n)<br>(Vn_PWM_FRT) |
|---|---|---|
| "1" | "1" | "1" |
| "0" | "1" | "0" |
| "1" | "0" | "0" |
| "0" | "0" | "0" |

The third signals are labelled Va_PWM_FRT, Vb_PWM_FRT and Vc_PWM_FRT and each has a high value (i.e., "1") indicating that the semiconductor switching devices of the corresponding phase of the supply bridge 46 should be turned on or a low value (i.e., "0") indicating that the semiconductor switching devices of the corresponding phase should be turned off or inhibited. Whether each third signal Va_PWM_FRT, Vb_PWM_FRT and Vc_PWM_FRT for phases "a", "b" and "c" has a high or low value is determined by the logical conjunction. For example, if the input to the first on-off controller 62A is outside the proportional band such that the second signal for phase "a" has a high value and the first signal Va_PWM_normal generated by the PWM generator 56 for phase "a" also has a high value, the third signal Va_PWM_FRT that is generated by the current limitation controller 58 for phase "a" will have a high value. If the input to the first on-off controller 62A is outside the proportional band such that the second signal for phase "a" has a high value and the first signal Va_PWM_normal generated by the PWM generator 56 for phase "a" has a low value, the third signal Va_PWM_FRT that is generated by the current limitation controller 58 for phase "a" will have a low value. The value of the third signal Va_PWM_FRT for phase "a" will effectively be determined by the value of the first signal Va_PWM_normal for phase "a" if the second signal for phase "a" has a high value because the input to the first on-off controller 62A is outside the proportional band. But if the input to the first on-off controller 62A is inside the proportional band such that the second signal for phase "a" has a low value and the first signal Va_PWM_normal generated by the PWM generator 56 for phase "a" has a high value or a low value, the third signal Va_PWM_FRT that is generated by the current limitation controller 58 for phase "a" will have a low value. It will be readily appreciated that the high value of the first signal Va_PWM_normal generated by the PWM generator 56 for phase "a" can be effectively overridden by the current limitation controller 58 if the input to the first on-off controller 62A is inside the proportional band. The same is true for first signals Vb_PWM_normal and Vc_PWM_normal generated by the PWM generator 56 for phases "b" and "c" if the input to the second and third on-off controllers 62B and 62C is inside the proportional band.

Figure 5:
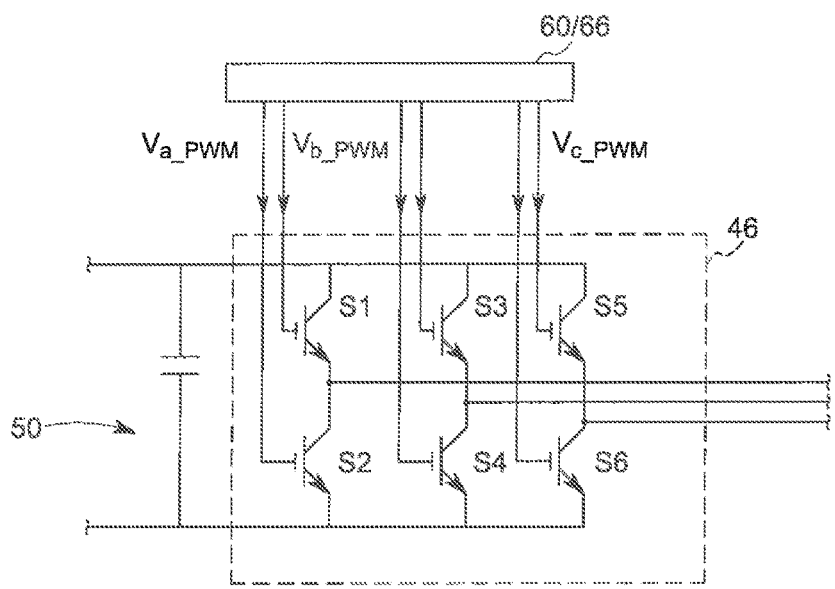
FIG. 5 is a schematic drawing showing the supply bridge of FIGS. 2 and 3.

With reference to FIGS. 2 and 5, the control selector 60 provides fourth signals (or command signals) to control the semiconductor switching devices S1 to S6 of the supply bridge 46 to turn on and off, e.g., by conventional gate control using gate drivers (not shown). The fourth signals are labelled Va_PWM, Vb_PWM and Vc_PWM and each has a high value (i.e., "1") indicating that the semiconductor switching devices of the corresponding phase of the supply bridge 46 should be turned on or a low value (i.e., "0") indicating that the semiconductor switching devices of the corresponding phase should be turned off or inhibited.

During normal operation of the marine power distribution and propulsion system 30, the control selector 60 receives the first signals Va_PWM_normal, Vb_PWM_normal and Vc_PWM_normal from the PWM generator 56 and provides them to the supply bridge 46 as the fourth signals Va_PWM, Vb_PWM and Vc_PWM for phases "a", "b" and "c". In other words, the fourth signals Va_PWM, Vb_PWM and Vc_PWM are identical to the first signals Va_PWM_normal, Vb_PWM_normal and Vc_PWM_normal when the marine power distribution and propulsion system 30 is operating normally. Each fourth signal Va_PWM, Vb_PWM and Vc_PWM has a high value when the corresponding first signal Va_PWM_normal, Vb_PWM_normal and Vc_PWM_normal has a high value and each fourth signal has a low value when the corresponding first signal has a low value. The semiconductor switching devices S1 to S6 of the supply bridge 46 are therefore effectively controlled to turn on and turn off according to a PWM control strategy that is applied by the PWM controller 52.

The control selector 60 can also receive the third signals Va_PWM_FRT, Vb_PWM_FRT and Vc_PWM_FRT from the current limitation controller 58 during normal operation but they are not provided to the supply bridge 46. In another arrangement, the control selector 60 will only receive the third signals Va_PWM_FRT, Vb_PWM_FRT and Vc_PWM_FRT from the current limitation controller 58 when a short-circuit fault has been detected.

If a short-circuit fault is detected, the control selector 60 receives the third signals Va_PWM_FRT, Vb_PWM_FRT and Vc_PWM_FRT from the current limitation controller 58 and provides them to the supply bridge 46 as the fourth signals Va_PWM, Vb_PWM and Vc_PWM for phases "a", "b" and "c". In other words, the fourth signals Va_PWM, Vb_PWM and Vc_PWM are identical to the third signals Va_PWM_FRT, Vb_PWM_FRT and Vc_PWM_FRT when the marine power distribution and propulsion system 30 has a short-circuit fault and short-circuit FRT is needed. Each fourth signal Va_PWM, Vb_PWM and Vc_PWM has a high value when the corresponding third signal Va_PWM_FRT, Vb_PWM_FRT and Vc_PWM_FRT has a high value and each fourth signal has a low value when the corresponding third signal has a low value. The semiconductor switching devices S1 to S6 of the supply bridge 46 are therefore effectively controlled to turn on and turn off according to a modified (or short-circuit FRT) PWM control strategy that is applied by the current limitation controller 58.

The control selector 60 can select between the first signals Va_PWM_normal, Vb_PWM_normal and Vc_PWM_normal generated by the PWM generator 56 and the third signals Va_PWM_FRT, Vb_PWM_FRT and Vc_PWM_FRT generated by the current limitation controller 58 on the basis of a status signal for the marine power distribution and propulsion system 30. In one arrangement, the current limitation controller 58 is only enabled in response to the short-circuit fault detection and will then start to provide the third signals Va_PWM_FRT, Vb_PWM_FRT and Vc_PWM_FRT to the control selector 60.

As described above, if the calculated difference between the measured phase current Ia for phase "a" and the corresponding reference phase current Ia_max for phase "a" is inside the proportional band of the first on-off controller 62A, the first signal Va_PWM_normal generated by the PWM generator 56 for phase "a" is effectively overridden by the current limitation controller 58 because the corresponding third signal Va_PWM_FRT (and hence the corresponding fourth signal Va_PWM provided by the control selector 60 to the supply bridge 46) is always a low value and the semiconductor switching devices S1 and S2 of phase "a" are controlled to turn off or inhibited. It will be readily appreciated that the corresponding third signal Va_PWM_FRT generated by the current limitation controller 58 for phase "a" always has a low value irrespective of whether or not the first signal Va_PWM_normal generated by the PWM generator 56 for phase "a" has a high value or a low value. This is because the second signal for phase "a" that is output by the first on-off controller 62A has a low value so the logical conjunction of the first and second signals for phase "a" will always provide a low value for the third signal Va_PWM_FRT.

On the other hand, if the calculated difference between the measured phase current Ia for phase "a" and the corresponding reference phase current Ia_max for phase "a" is outside the proportional band of the first on-off controller 62A, the first signal Va_PWM_normal generated by the PWM generator 56 for phase "a" is not overridden by the current limitation controller 58. This is because the corresponding third signal Va_PWM_FRT (and hence the corresponding fourth signal Va_PWM provided by the control selector 60 to the supply bridge 46) will have a high value when the first signal Va_PWM_normal generated by the PWM generator 56 for phase "a" has a high value and a low value when the first signal Va_PWM_normal for phase "a" has a low value. So the semiconductor switching devices S1 and S2 of phase "a" are controlled to turn on or controlled to turn off or inhibited according to whether the first signal Va_PWM_normal generated by the PWM generator 56 for phase "a" has a high value or a low value, respectively. The second signal that is output by the first on-off controller 62A has a high value so the logical conjunction of the first and second signals for phase "a" will provide a high value for the third signal Va_PWM_FRT if the first signal Va_PWM_normal generated by the PWM generator 56 for phase "a" has a high value and a low value for the third signal Va_PWM_FRT if the first signal Va_PWM_normal has a low value. The same is true for phases "b" and "c".

The on-off controllers 62A, 62B and 62C operate in parallel and provide separate outputs that depend on the measured phase currents Ia, Ib and Ic for phases "a", "b" and "c" at the prevailing time.

The size of the proportional band of each on-off controller 62A, 62B and 62C and the reference phase currents Ia_max, Ib_max and Ic_max can be determined in accordance with thermal analysis of the supply bridge 46, and in particular the semiconductor switching devices S1 to S6.

In the event of a short-circuit fault, the electrical machine 34 of the hybrid drive system 30 can be driven by the diesel engine 36 and used as a generator to supply power to the ac bus through the AFE converter 44. The machine bridge 48 will be operated as an active rectifier and the supply bridge 46 will be operated as an inverter with the semiconductor switching devices S1 to S6 being turned on and off under the effective control of the current limitation controller 58 to provide short-circuit FRT on the basis of the modified PWM control strategy. The current limitation controller 58 allows the AFE converter 44 to provide controlled overcurrent for a certain period of time to allow the circuit breaker to properly discriminate and disconnect the faulty load branch.

Figure 6:
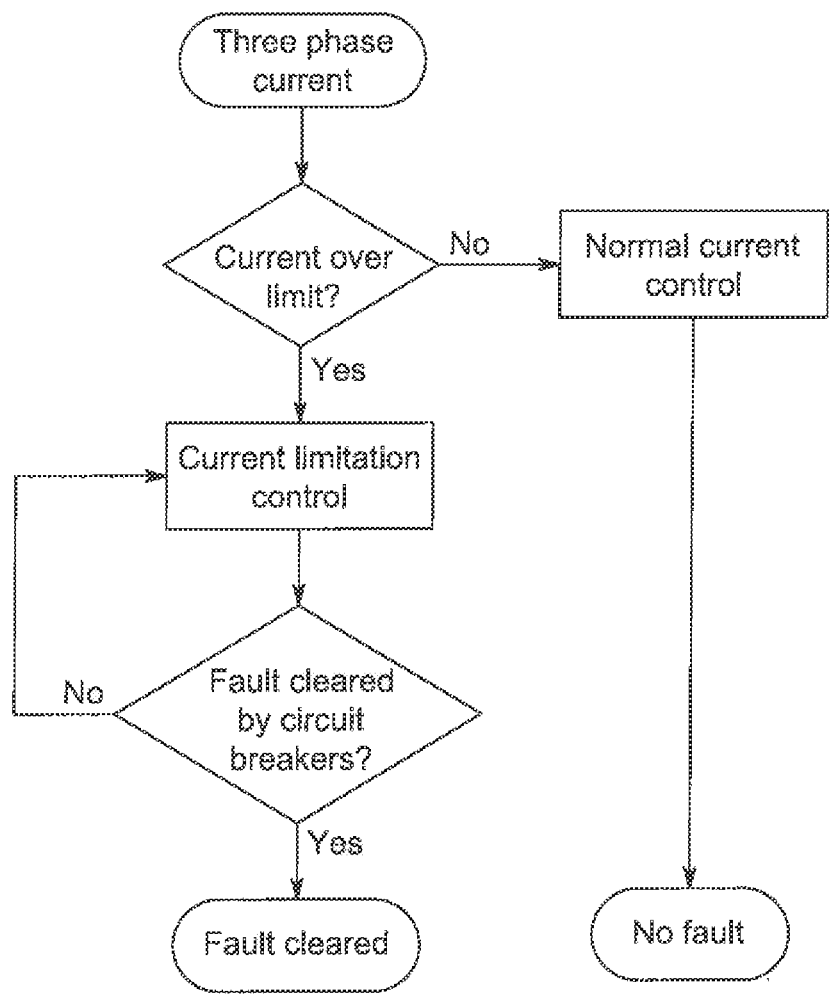
FIG. 6 is a flow diagram showing the steps of a short-circuit fault ride-through (FRT) method.

The steps of the short-circuit FRT method are shown in FIG. 6. If there is no short-circuit fault (i.e., if a measured current is not over a predetermined limit or threshold), the semiconductor switching devices S1 to S6 of the supply bridge 46 are turned on and off according to a suitable PWM control strategy determined by the PWM controller 52 on the basis of the fourth signals Va_PWM, Vb_PWM and Vc_PWM for phases "a", "b" and "c" provided by the control selector 60 and which are identical to the first signals Va_PWM_normal, Vb_PWM_normal and Vc_PWM_normal generated by the PWM generator 56. The AFE converter 44 can be operated in either PTO or PTI mode with the supply bridge 46 being controlled accordingly.

If a short-circuit fault is detected, the semiconductor switching devices S1 to S6 of the supply bridge 46 are turned on and off under the control of the current limitation controller 58 to provide overcurrent until the fault has been cleared by the circuit breaker. More particularly, the semiconductor switching devices S1 to S6 of the supply bridge 46 are turned on and off according to a modified PWM control strategy on the basis of the fourth signals Va_PWM, Vb_PWM and Vc_PWM for phases "a", "b" and "c" provided by the control selector 60 and which are identical to the third signals Va_PWM_FRT, Vb_PWM_FRT and Vc_PWM_FRT generated by the current limitation controller 58. Current limitation control is applied until the short-circuit fault has been cleared by the circuit breaker, after which normal current control is resumed.

Figure 7:
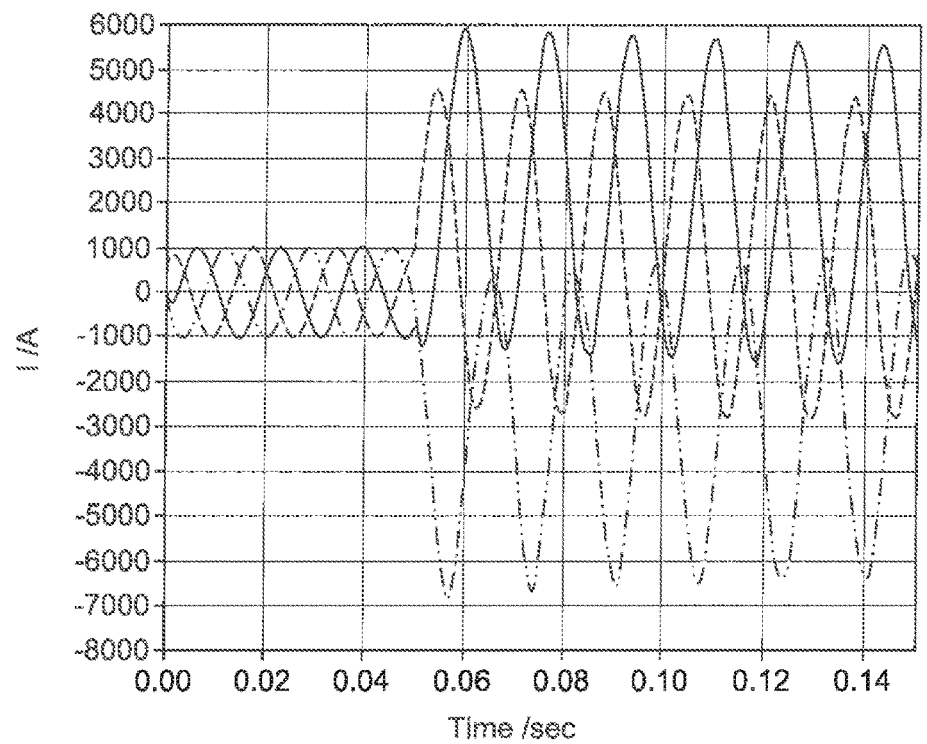
FIG. 7 is a fault current waveform produced by the short-circuit FRT method.

FIG. 7 shows a short-circuit fault current waveform produced by the short-circuit FRT method.

Figure 8:
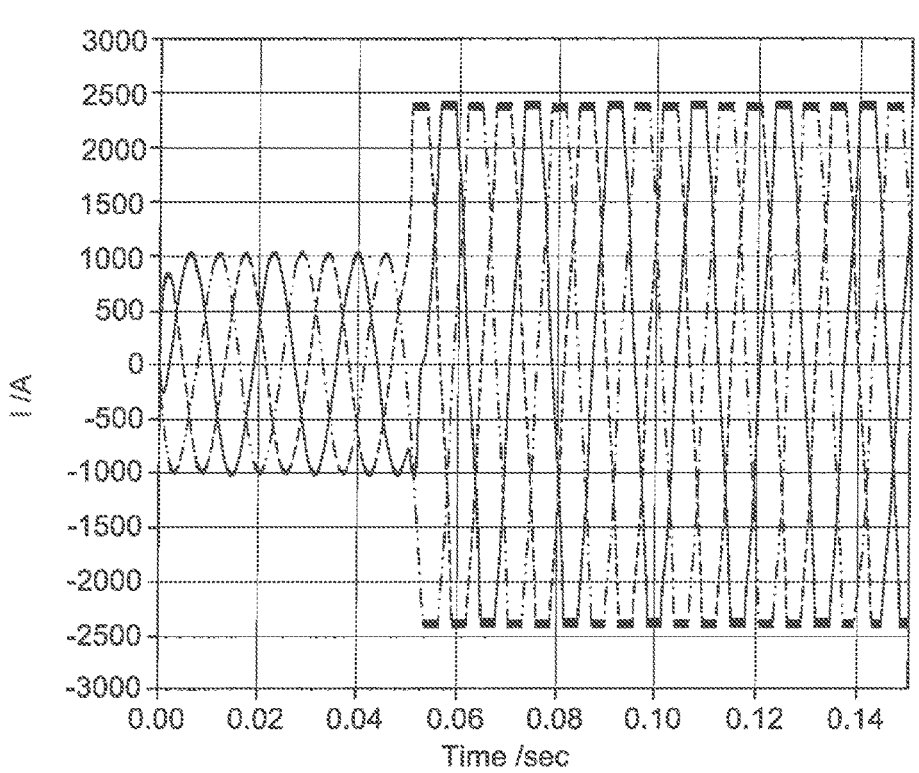
FIG. 8 is a fault current waveform produced using a known passive, impedance-based, method.

This can be contrasted with FIG. 8 which shows a short-circuit fault current waveform produced by a passive, impedance-based, method. It can be seen that the waveform of FIG. 8 has significant dc offsets between the individual phase fault currents which are not present in the waveform of FIG. 7.

Figure 3:
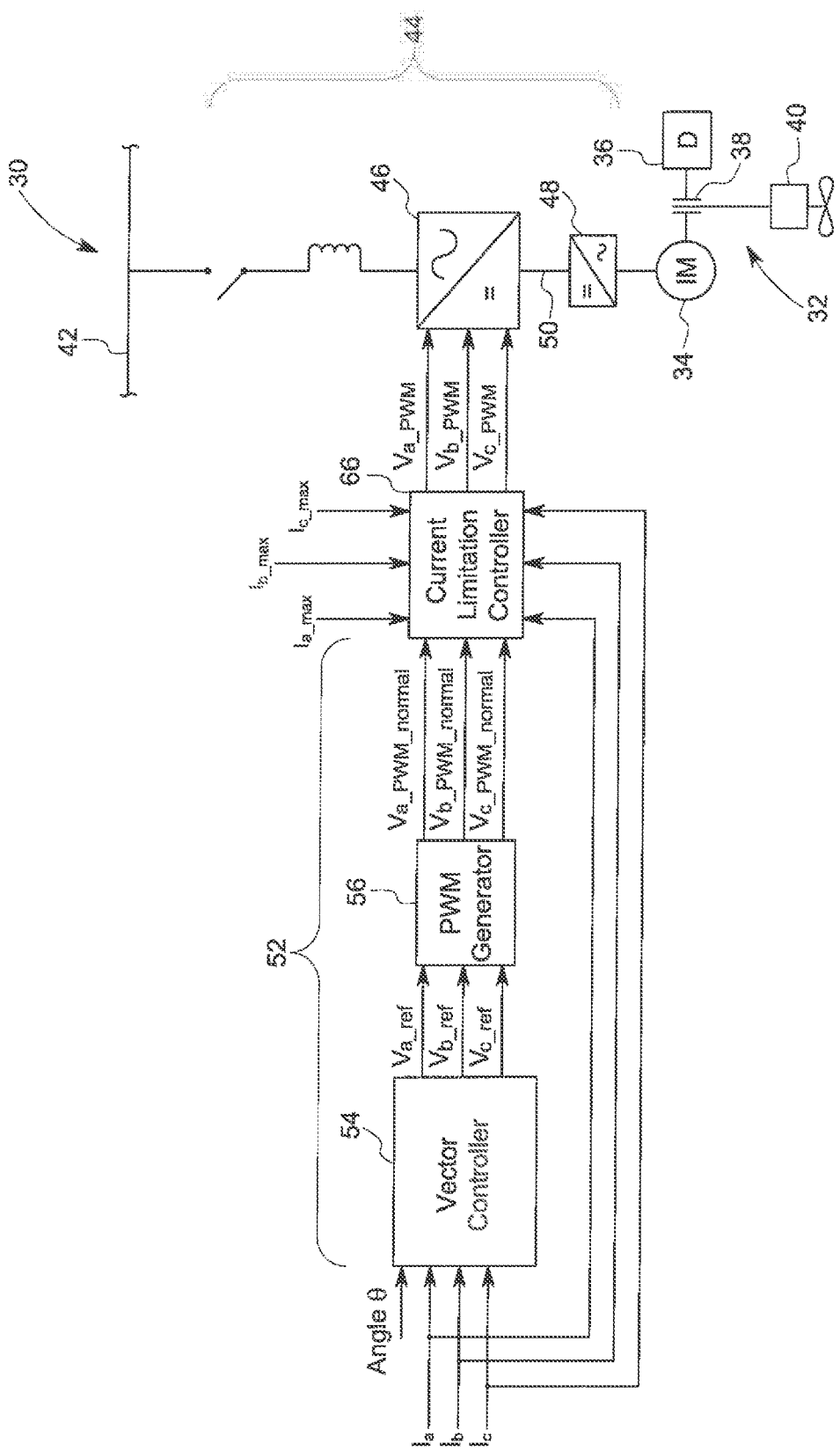
FIG. 3 is a schematic drawing showing part of a marine power distribution and propulsion system with a second current limitation controller.

FIG. 3 shows an alternative current limitation controller 66. The overall arrangement shown in FIG. 3 is similar to that shown in FIG. 2 and like parts have been given the same reference sign and operate as described above.

The control selector 60 shown in FIG. 2 has been omitted and the first signals Va_PWM_normal, Vb_PWM_normal and Vc_PWM_normal generated by the PWM generator 56 for phases "a", "b" and "c" are only provided to the current limitation controller 66. The third signals are generated by the current limitation controller 66 in exactly the same way as described above but are provided directly to the supply bridge 46 as command signals and are now labelled Va_PWM, Vb_PWM and Vc_PWM. The current limitation controller 66 operates continuously and there is no need to discriminate between normal operation of the marine power distribution and propulsion system 30 and the detection of a short-circuit fault. But like the current limitation controller 58 shown in FIG. 2, the current limitation controller 66 only overrides the first signals Va_PWM_normal, Vb_PWM_normal and Vc_PWM_normal generated by the PWM generator 56 for phases "a", "b" and "c" when the calculated difference between the measured phase current Ia, Ib and Ic and the corresponding reference phase current Ia_max, Ib_max and Ic_max is inside the proportional band of the corresponding on-off controller 62A, 62B and 62C. During normal operation, or during a short-circuit fault but where the calculated difference between the measured phase current Ia, Ib and Ic and the corresponding reference phase current Ia_max, Ib_max and Ic_max is outside the proportional band of the corresponding on-off controller 62A, 62B and 62C, the first signals Va_PWM_normal, Vb_PWM_normal and Vc_PWM_normal generated by the PWM generator 56 for phases "a", "b" and "c" are not overridden by the current limitation controller 66 because the third signals Va_PWM, Vb_PWM and Vc_PWM will have a high value when the corresponding first signal Va_PWM_normal, Vb_PWM_normal and Vc_PWM_normal has a high value and a low value when the corresponding first signal Va_PWM_normal, Vb_PWM_normal and Vc_PWM_normal has a low value. So the semiconductor switching devices S1 to S6 of the supply bridge 46 are controlled to turn on or controlled to turn off or inhibited according to whether the first signals Va_PWM_normal, Vb_PWM_normal and Vc_PWM_normal have a high value or a low value, respectively.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power distribution system having one or more phases, the power distribution system comprising a power converter with a plurality of semiconductor switching devices per phase, a pulse width modulation controller, and a current limitation controller adapted, at least when a short-circuit fault is detected, to:

calculate the difference between a measured current for each phase and a reference current for the corresponding phase; and if the calculated difference is located outside a predetermined current range centered about the reference current for the corresponding phase, allow the semiconductor switching devices of the corresponding phase to be turned on and off by the PWM controller;

if the calculated difference is located inside the predetermined current range, control the semiconductor switching devices for the corresponding phase to be turned off.

2. The power distribution system according to claim 1, wherein the PWM controller generates a first signal per phase having a first value indicating that the semiconductor switching devices for the corresponding phase should be turned on and a second value indicating that the semiconductor switching device for the corresponding phase should be turned off; and wherein the current limitation controller is further adapted, at least when a short-circuit fault is detected, to:

generate a second signal per phase having a first value indicating that the semiconductor switching devices for the corresponding phase can be turned on if the calculated difference is located outside a predetermined current range centered about the reference current for the corresponding phase or a second value indicating that the semiconductor switching devices for the corresponding phase should be turned off if the calculated difference is located inside a predetermined current range; and use the first and second signals to generate a third signal per phase having a first value indicating that the semiconductor switching devices for the corresponding phase should be turned on and a second value indicating that the semiconductor switching devices for the corresponding phase should be turned off, the current limitation controller optionally being adapted to generate each third signal by applying a logical conjunction to the corresponding first and second signals.

3. The power distribution system according to claim 2, wherein each third signal has the first value if both the corresponding first and second signals have the first value and otherwise the third signal has the second value.

4. The power distribution system according to claim 1, wherein the current limitation controller includes an on-off controller for each phase with a proportional band that is centered about the reference current for the corresponding phase and which defines the predetermined current range.

5. The power distribution system according to claim 4, wherein each on-off controller receives the calculated difference between the measured current and the reference current for the corresponding phase as an input, and provides the second signal as an output.

6. The power distribution system according to claim 1, further comprising an electrical machine.

7. The power distribution system according to claim 6, wherein the electrical machine forms part of a hybrid drive system further comprising a prime mover, the rotor of the electrical machine and the driving end of the prime mover being mechanically coupled to a load by means of a mechanical linkage such as a clutch and/or gearbox.

8. The power distribution system according to claim 6, further comprising an ac bus and wherein the electrical machine is electrically connected to the ac bus by the power converter.

9. The power distribution system according to claim 8, wherein the power converter has ac input terminals electrically connected to the ac bus of the power distribution system, and dc output terminals.

10. The power distribution system according to claim 9, further comprising a second power converter having dc input terminals electrically connected to the dc output of the power converter by a dc link, and ac output terminals electrically connected to the electrical machine.

11. The power distribution system according to claim 1, wherein the reference current and/or the current range for each phase is/are determined with reference to design parameters of the power converter and/or the power distribution system.

12. A short-circuit fault ride-through method for a power distribution system having one or more phases, the power distribution system comprising a power converter with a plurality of semiconductor switching devices per phase, the method comprising the steps of:
  calculating the difference between a measured current for each phase and a reference current for the corresponding phase; and
  if the calculated difference is located outside a predetermined current range centered about the reference current for the corresponding phase, allowing the semiconductor switching devices of the corresponding phase to be turned on and off;
  if the calculated difference is located inside the predetermined current range, controlling the semiconductor switching devices for the corresponding phase to be turned off.

13. A method according to claim 12, further comprising the steps of:
  generating a first signal per phase having a first value indicating that the semiconductor switching devices for the corresponding phase should be turned on and a second value indicating that the semiconductor switching device for the corresponding phase should be turned off;
  generating a second signal per phase having a first value indicating that the semiconductor switching devices for the corresponding phase can be turned on if the calculated difference is located outside the predetermined current range centered about the reference current for the corresponding phase or a second value indicating that the semiconductor switching devices for the corresponding phase should be turned off if the calculated difference is located inside a predetermined current range; and
  using the first and second signals to generate a third signal per phase having a first value indicating that the semiconductor switching devices for the corresponding phase should be turned on and a second value indicating that the semiconductor switching devices for the corresponding phase should be turned off, each third signal optionally being generated by applying a logical conjunction to the corresponding first and second signals.

14. The method according to claim 12, wherein the power distribution system further comprises an ac bus electrically connected to the power converter, and the power converter provides controlled overcurrent to the ac bus until the short-circuit fault is cleared.

15. The method according to claim 12, wherein the reference current and/or the current range for each phase is/are determined with reference to design parameters of the power converter and/or the power distribution system.

* * * * *